P. S. DEVLAN.
Gas Stove.
No. 19,185.
Patented Jan. 26, 1858.
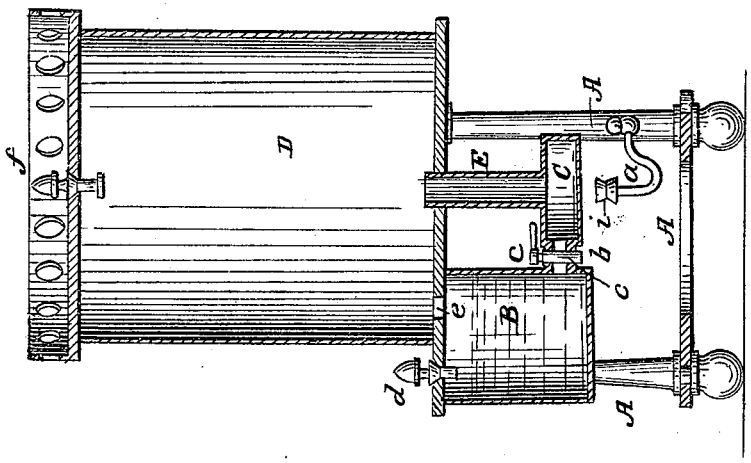
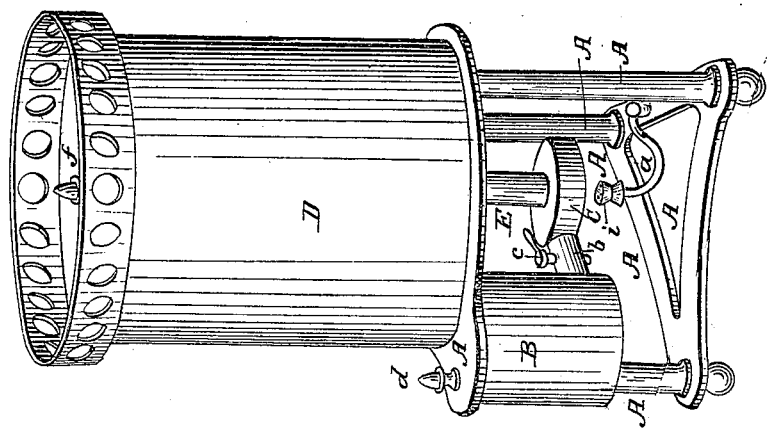

UNITED STATES PATENT OFFICE.

P. S. DEVLAN, OF CAMDEN, NEW JERSEY.

GAS HEATING APPARATUS.

Specification of Letters Patent No. 19,185, dated January 26, 1858.

*To all whom it may concern:*

Be it known that I, PATRICK S. DEVLAN, of Camden, in the county of Camden and State of New Jersey, have invented certain new and useful Improvements in Apparatus for Heating Rooms, Chambers, or Buildings by Gas, which apparatus may be of a portable character, so as to be heated by the ordinary gas-burner which lights said room or chamber; and I do hereby declare the following to be a full, clear, and exact description of the construction and operation of the same, reference being had to the accompanying drawings, making a part of this specification, in which—

Figure 1 represents a perspective view of the apparatus complete, and Fig. 2, represents a vertical section through the same.

Similar letters of reference where they occur in the separate figures, denote like parts of the apparatus in both of them.

The nature of my invention consists in the manner in which I have arranged the water tank, the steam generator, and the radiating chamber, for the purpose of making a portable gas heating apparatus, for warming rooms, chambers, &c.

To enable others skilled in the art to make and use my invention, I will proceed to describe the same with reference to the drawings.

A represents a supporting frame, or base for the apparatus, which may be made plain or ornamental as may be preferred. To this frame is attached or connected a reservoir or tank B, for containing water; a steam generator C, and a radiator D, which parts, with their connections form the main elements of the apparatus. A gas bracket $a$, may be affixed to the frame, and connected with the gas pipe, in any of the well known ways, so that gas may be brought, and burned in it, said bracket being hinged to the frame, so as to be swung under, or from the generator as may be required.

The apparatus is mainly designed to be used with gas as a heating medium, because the common illuminating gas, may be divided into small jets, and by introducing more oxygen into it, it becomes a highly heating gas, losing its illuminating property in the same ratio, and is thus peculiarly adapted to lighting and heating, as it may be required for either purpose, and readily changed from one to the other.

A pipe $b$ having in it a stop cock $c$, connects the reservoir B, with the generator C. This stop cock is so turned or set, as to allow the water from the tank B, into the generator C, no faster than it is, or can be, converted into steam. The generator is best made of copper, and so as to have a tolerably broad surface exposed to the gas flame, but said surface is to be covered by a very thin strata or sheet of water, just enough to be almost instantly converted into steam, when it touches the heated plate of the generator.

From the generator C, a pipe E, leads up into the radiator D, through which pipe the steam passes immediately from the generator into said radiator, and heating it, it disseminates its heat through the chamber or room in which it is placed.

An opening $e$, is made from the radiator to the tank, forming a passage from the former to the latter for the water of condensation to pass through, and thus be used over again and again; and retaining a considerable degree of its heat, it heats up the feed water in the tank, which not only facilitates its conversion again into steam, but the tank will also radiate some heat from the heated water within it.

A safety valve $f$, is placed in the radiating vessel or cylinder D, so that if at any time there should be an undue pressure of steam therein said valve will rise and allow it to escape.

The tank is supplied with water, through an opening, in which a stopper is placed.

The apparatus may be plain, or highly ornamented, and can be made of copper, brass, iron, or parts of each. It is designed to be placed on the mantle piece, table, or any convenient part of the room, the gas being conducted to it by a flexible pipe, and changed about to suit the convenience of the user. The burner $i$, may have wire gauze or a perforated plate, as seen in the drawings, over its top, for breaking up the gas into small jets, and by taking in below the burner a volume of atmospheric air, and mixing it with the gas thus broken up, it produces a very high degree of heat.

It will be seen that the pipe E, extends above the bottom of the cylinder D, sufficiently far to prevent any of the water of condensation from running back through said pipe to the generator, and it must of necessity go back to the tank B. By this means the flow of water into the generator is regular and uniform while if the water of condensation ran back immediately into the generator, the condensation, and supply would be in the inverse ratio of the heat—most when the heat was least and vice versa. But by taking it to the tank, this irregularity is avoided.

Having thus fully described the nature and object of my invention, what I claim therein as new and desire to secure by Letters Patent is—

The arrangement of the tank, generator, and radiator, with each other, and with a gas burner, substantially as herein set forth, and for the purpose of making a gas heating apparatus for warming rooms, chambers &c., as described.

P. S. DEVLAN.

Witnesses:
 THOS. H. UPPERMAN,
 E. COHEN.